United States Patent

Teng

Patent Number: 5,142,126
Date of Patent: Aug. 25, 1992

[54] INJECTION MOLDING MANIFOLD WITH INTEGRAL HEATED INLET PORTION

[75] Inventor: Alex C. Teng, Downsview, Canada

[73] Assignee: Mold-Masters Limited, Georgetown, Canada

[21] Appl. No.: 726,883

[22] Filed: Jul. 8, 1991

[51] Int. Cl.⁵ .............................. H05B 3/06
[52] U.S. Cl. ........................ 219/421; 219/424; 219/544; 425/547; 425/551
[58] Field of Search ........... 219/523, 530, 421, 541, 219/544, 420, 422, 423, 424; 425/549, 568, 551, 552, 570, 566, 547

[56] References Cited

U.S. PATENT DOCUMENTS

| | | | |
|---|---|---|---|
| 4,438,325 | 3/1984 | Gellert | 219/536 |
| 4,609,138 | 9/1986 | Harrison | 228/161 |
| 4,666,396 | 5/1987 | Shaw | 425/549 |
| 4,669,971 | 6/1987 | Gellert | 425/549 |
| 4,688,622 | 8/1987 | Gellert | 164/61 |
| 4,768,283 | 9/1988 | Gellert | 29/611 |
| 4,771,164 | 9/1988 | Gellert | 219/421 |
| 4,777,348 | 10/1988 | Gellert | 219/421 |
| 4,837,925 | 6/1989 | Gellert | 29/619 |

FOREIGN PATENT DOCUMENTS 2017055 5/1990 Canada .
2032728 12/1990 Canada .

Primary Examiner—Bruce A. Reynolds
Assistant Examiner—Michael D. Switzer
Attorney, Agent, or Firm—Dalesman & Company

[57] ABSTRACT

A compact injection molding melt distribution manifold. The manifold has integral or monolithic inlet and main portions and both portions have a common electrical heating element. A melt passage extends through the manifold from a common inlet in the inlet portion and branches in the main portion to a number of spaced outlets leading to different gates.

4 Claims, 2 Drawing Sheets

INJECTION MOLDING MANIFOLD WITH INTEGRAL HEATED INLET PORTION

BACKGROUND OF THE INVENTION

This invention relates generally to injection molding and more particularly to an injection molding melt distribution manifold having an integral heated inlet portion.

Steel manifolds are mounted in an injection molding system and have a melt passage with a common inlet and a number of spaced outlets to distribute pressurized melt received from a molding machine to a number of different gates. Each system can have one or more manifolds with a variety of different configurations depending upon a number of factors, such as the number of gates, size and shape of the cavities, and type of material being molded. These manifolds are often heated to compensate for heat loss to the surrounding cooled cavity and back plates and maintain a more uniform temperature of the melt flowing through them. Gellert Canadian patent application serial number 2,017,055 filed May 17, 1990 entitled "Injection Molding Cast Manifold" shows an example of a manifold having an integral electrical heating element extending around a tortuous path.

Canadian application serial no. 2,017,055 also shows the manifold having an extension which extends rearwardly to receive melt from the molding machine. The manifold extension does not have a heating element and is fastened to the manifold by bolts. U.S. Pat. Nos. 4,669,971 to Gellert which issued Jun. 2, 1987 and 4,777,348 to Gellert which issued Oct. 11, 1988 disclose earlier examples of manifold extensions which are fastened to the manifold by screws. U.S. Pat. No. 4,438,325 to Gellert shows a heater cast which acts as a manifold extension and has a heating element separate from the heating element in the manifold. While this configuration is satisfactory for many applications, problems can arise in controlling the temperature of two different heating elements and in fastening the manifold extension to the manifold. Furthermore, the increasing demand for systems having greater numbers of gates has made compact component size even more critical.

SUMMARY OF THE INVENTION

Accordingly, it is an object of the present invention to at least partially overcome the problems of the prior art by providing a melt distribution manifold having a common electrical heating element extending through integral main and inlet portions.

To this end, in one of its aspects, the invention provides an injection molding melt distribution manifold having a main portion with a forward face and a rear face, a melt passage extending therethrough and branching therein to a plurality of spaced outlets on the forward face, an integral electrical heating element extending from an external terminal in a predetermined tortuous path in the main portion, having the improvement wherein the manifold has an integral inlet portion extending rearwardly from the rear face of the main portion, the inlet portion having a cylindrical outer surface and a rear end, the melt passage extending centrally through the inlet portion from an inlet at the rear end, and the electrical heating element having a rear helical portion extending around the inlet portion.

Further objects and advantages of the invention will appear from the following description, taken together with the accompanying drawings.

DETAILED DESCRIPTION OF THE DRAWINGS

Figure 2:
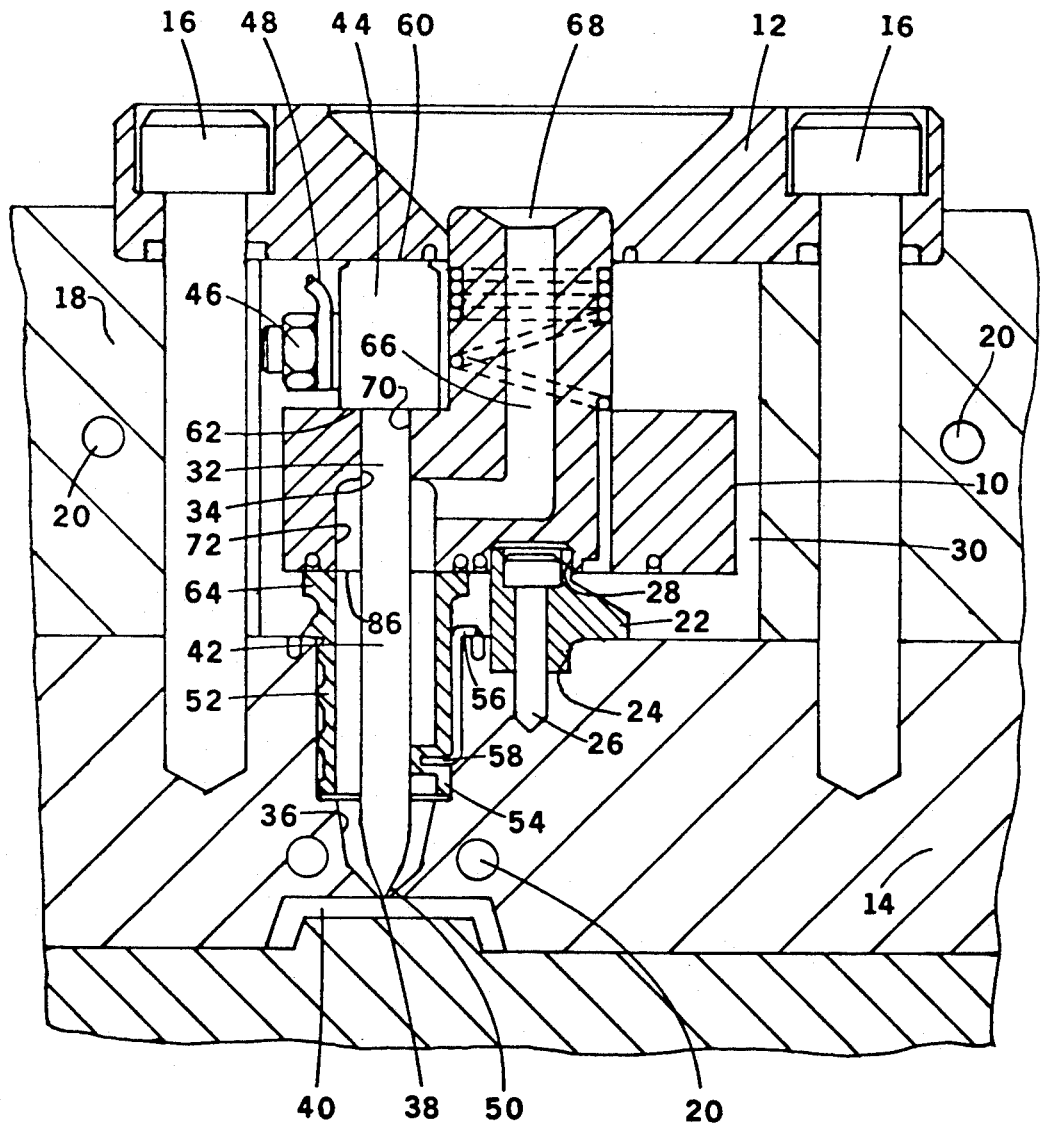
FIG. 2 is a partial sectional view showing the probes and manifold along line 2—2 in FIG. 1 and a portion of the surrounding mold.

Reference is first made to FIG. 2 which shows a melt distribution manifold 10 according to a first embodiment of the invention mounted in a mold between a locating ring 12 and a cavity plate 14. The locating ring 12 is secured in position by bolts 16 which extend through a support plate 18 into the cavity plate 14. The cavity plate 14 and the support plate 18 are cooled by pumping cooling water through cooling conduits 20. In addition to the locating ring 12, the manifold 10 is located centrally by a locating member 22 which is secured in a seat 24 in the cavity plate 14 by a bolt 26 and which extends into a matching seat 28 in the manifold 10. As is well known, the heated manifold 10 is thermally separated to a considerable extent from the surrounding cooled components of the mold by an insulative air space 30. Thus, in order to reduce heat loss, steel to steel contact is minimized between the inner heated components and the surrounding outer cooled components.

Figure 1:
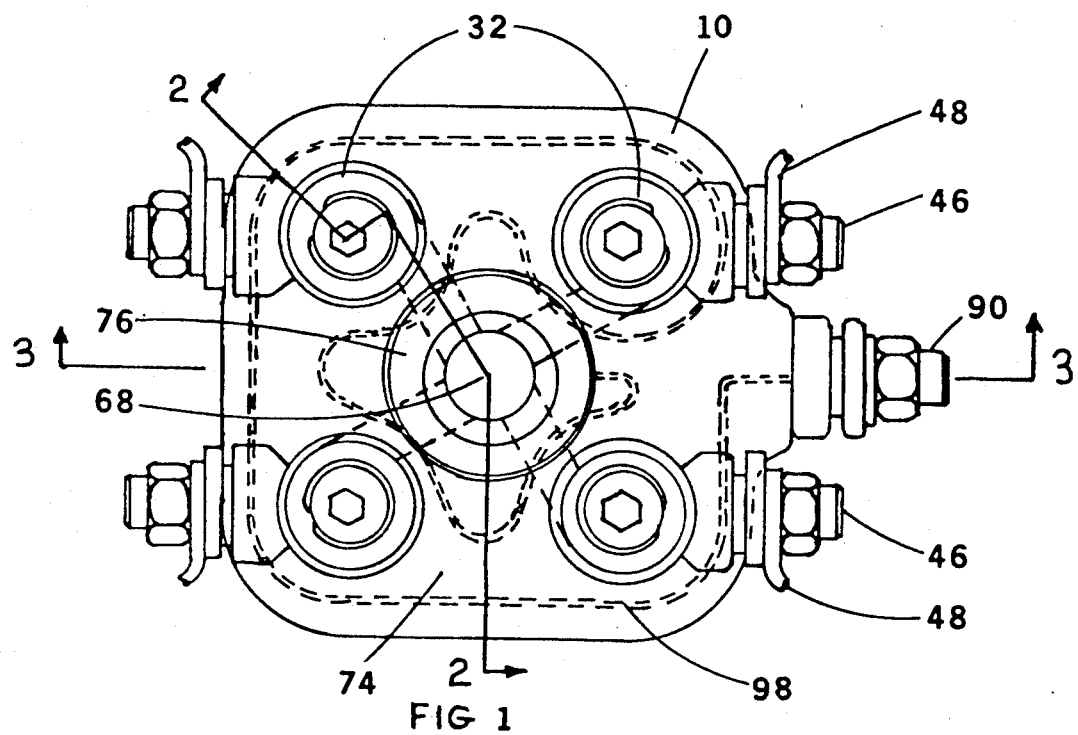
FIG. 1 is a plan view of four heated probes mounted in a heated manifold according to a preferred embodiment of the invention.

As also seen in FIG. 1, in this embodiment of the invention each manifold 10 has four heated probes 32 extending therethrough. As described in Gellert Canadian patent application serial no. 2,032,728 filed Dec. 19, 1990 entitled "Injection Molding Probe with Varying Heat Probe", each probe 32 extends through a bore 34 through the manifold 10 into a well 36 in the cavity plate 14. As seen in FIG. 2, each well 36 leads to a gate 38 which extends through the cavity plate 14 to a cavity 40. While the system shown has four probes 32 aligned with four gates 38 leading to four different cavities 40, other systems can have a different number of gates 38, and the gates can all lead to a common larger cavity. Each probe 32 has an elongated cylindrical forward portion 42 and a larger diameter rear head portion 44. The rear head portion 44 has an outwardly extending electrical terminal 46 to receive a lead 48 from an external power source (not shown). The forward portion 42 has a pointed forward end 50 which is aligned with the gate 38. The forward portion 42 of the probe 32 is accurately located in this position by a locating and insulating sleeve 52 which is seated in the well 36 around it. As shown in Canadian patent application serial no. 2,032,728 mentioned above, the locating and insulating sleeve 52 has three radial locating fins 54 which extend inwardly to contact the forward portion 42 of the probe 32, but allow the melt to flow between them. A thermocouple 56 extends into a bore 58 in one of the fins 54 to monitor the temperature of the melt flowing past it.

Bolting the locating ring 12 against the rear ends 60 of the probes 32 also accurately locates the manifold 10 and the probes 32 longitudinally. The head portion 44 of each probe 32 has a shoulder 62 which abuts against the manifold 10. Each locating sleeve 52 has a rear collar portion 64 which extends outwardly between the manifold 10 and the cavity plate 14. Thus, the manifold 10 can receive the repeated injection forces from the molding machine (not shown) without disturbing the accurate location of the pointed forward ends 50 of the probes 32 relative to their respective gates 38. The pressure applied to the rear collar portions 64 of the locating sleeves 52 by the bolts 26 also seals against leakage of pressurized melt flowing through the melt passage 66. The melt passage 66 branches in the manifold 10 from a common inlet 68 and extends through each locating sleeve 52 into the well 36 to the respective gate 38. Each bore 34 through the manifold 10 has a rear portion 70 and a larger diameter forward portion 72. The diameter of the rear portion 70 is just large enough to snugly receive the forward portion 42 of the probe 32 to prevent leakage of the pressurized melt between them. The diameter of the forward portion 72 matches the inner diameter of the locating sleeve 52 and is large enough to allow the melt to flow through the melt passage 66 around the forward portion 42 of the probe 32.

Figure 3:
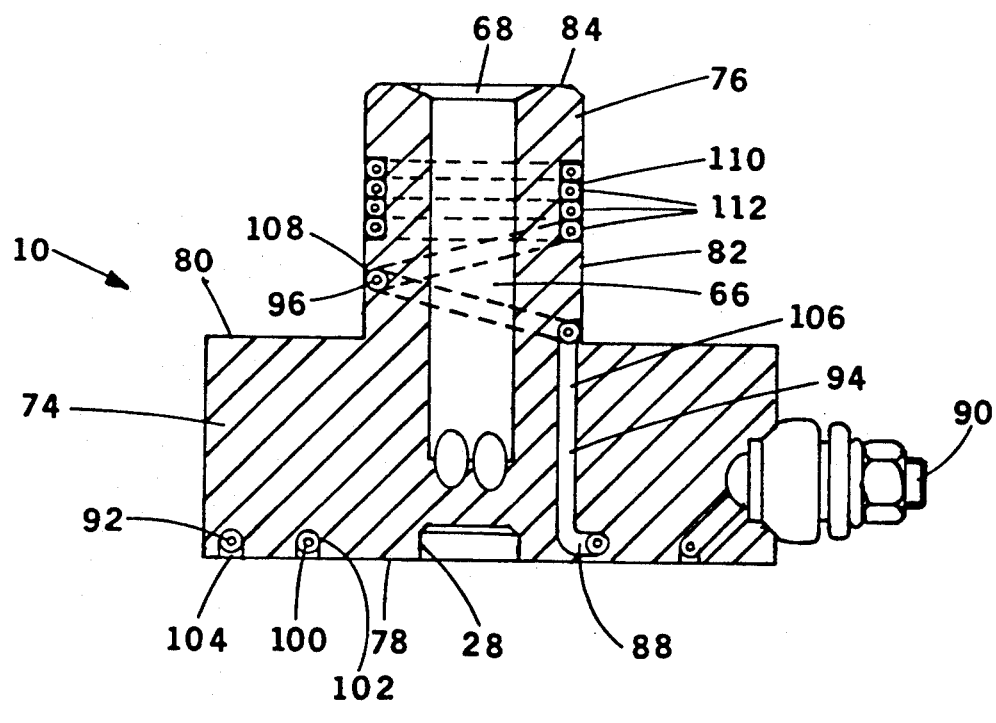
FIG. 3 is a sectional view of the manifold itself along line 3—3 in FIG. 1.

Reference is now made to FIG. 3 which shows a manifold 10 according to a preferred embodiment of the invention. The manifold 10 has a main portion 74 and an integral inlet portion 76. The main portion 74 has a forward face 78 and a rear face 80. The inlet portion 76 has a cylindrical outer surface 82 and extends rearwardly from the rear face 80 of the main portion 74 to a rear end 84. The melt passage 66 extends centrally through the cylindrical inlet portion 76 from the inlet 68 at the rear end 84 and branches in the main portion 74 to four spaced outlets 86 (FIG. 2) on the forward face 78.

The manifold 10 also has an integral electrical heating element 88 which extends from an external terminal 90 through both the main portion 74 and the integral inlet portion 76. In this embodiment of the invention, the heating element 88 has a forward portion 92, a central portion 94, and a rear helical portion 96. The forward portion 92 extends from the external terminal 90 along a tortuous path 98 (FIG. 1) adjacent the forward face 78 of the main portion 74 of the manifold 10. The central portion 94 of the heating element 88 then extends rearwardly through the main portion 74 of the manifold 10 to the rear helical portion 96 which extends around the cylindrical inlet portion 76 of the manifold 10. In this embodiment, the heating element 88 has a nickel-chrome resistance wire 100 which is grounded at the rear end of the heating element. The resistance wire 100 extends through a refractory powder such as magnesium oxide in a steel casing 102. In another embodiment, the forward portion of the heating element can extend along a tortuous path adjacent the rear face 80 of the main portion 74 of the manifold and then connect directly to the rear helical portion of the heating element extending around the cylindrical inlet portion of the manifold.

A manifold 10 according to the preferred embodiment of the invention is manufactured as follows. The main portion 74 and cylindrical inlet portion 76 are machined out of steel. The main portion is gun drilled and plugged to form the melt passage 66 similar to the method described in U.S. Pat. No. 4,609,138 to Harrison which issued Sep. 2, 1986. A channel 104 is cut along a predetermined tortuous path 98 in the forward face 78 of the main portion 74. Installation of an electrical heating element in a channel cut in a manifold is described in U.S. Pat. No. 4,688,622 to Gellert which issued Aug. 25, 1987. A hole 106 is drilled from this channel 104 through the main portion 74 of the manifold 10 to connect to a spiral channel 108 which is cut around the cylindrical outer surface 82 of the inlet portion 76 of the manifold. Installation of an electrical heating element in a spiral channel cut in the surface of a cylindrical nozzle is disclosed in U.S. Pat. No. 4,768,283 to Gellert which issued Sep. 6, 1988. After the heating element is wound in place in the spiral channel 108 around the inlet portion 76, it is pulled through the bore 106 through the main portion 74 and the inlet portion 76 is mounted in place on the main portion 74. The heating element is then wound in place in the channel 104 in the main portion 74 and the external terminal 90 is installed as described in U.S. Pat. No. 4,837,925 to Gellert which issued Jun. 13, 1989. As can be seen in FIG. 3, in this embodiment, the spiral channel 108 has a wide portion 110 closest to the rear end 84 of the inlet portion 76 wherein several coils 112 of the rear helical portion 96 of the heating element 88 are wound side by side. This provides additional heat to compensate for heat lost through contact with the locating ring 12. Different amounts of heat can also be provided to different locations by cutting the spiral channel 108 with a predetermined varying pitch.

A nickel alloy brazing material is then applied to the outer surfaces of the assembled main and inlet portions 74, 76 before they are heated in batches in a vacuum furnace. In this embodiment, as the furnace is gradually heated to a temperature of approximately 2000° F., the furnace is evacuated to a relatively high vacuum to remove nearly all the oxygen. Before the melting point of the nickel alloy is reached, the vacuum is reduced by partially backfilling the furnace with an inert gas such as nitrogen. When the nickel alloy melts, it flows by capillary action around the heating element 88 to fill the hole 106 and channels 104, 106 and integrally embed the heating element 88. The molten nickel alloy also flows between the main portion 74 and the inlet portion 76 to integrally bond them together. Brazing in a vacuum furnace provides a metallurgical bonding of the components which improves the efficiency of heat transfer from the heating element 88. After the manifolds 10 are cooled and removed from the vacuum furnace they are machined to remove any excess material.

In use, the injection molding system is assembled as shown in FIG. 2. Electrical power is applied to the heating element 88 in the manifold 10 and to the heating element in each probe 32 to heat them to a predetermined operating temperature. Pressurized melt from a molding machine (not shown) is then injected into the melt passage 66 through the common inlet 68 according to a predetermined cycle in a conventional manner. The pressurized melt flows through the heated manifold 10 where it branches to flow along around each heated probe 32 and through the gates 38 to fill the cavities 40. After the cavities are filled, injection pressure is held momentarily to pack and then released. After a short cooling period, the mold is opened to eject the molded products. After ejection, the mold is closed and injection pressure is reapplied to refill the cavities 40. This cycle is continuously repeated with a frequency dependent on the size and shape of the cavities and the type of material being molded.

While the description of the heated manifold has been given with respect to a preferred embodiment, it will be evident that various modifications are possible without departing from the scope of the invention as understood by those skilled in the art and as defined in the following claims. For instance, it is apparent that a number of manifolds according to the invention can be used in an injection molding system to receive melt from a common bridging manifold which, in turn, receives melt from the molding machine. This multiplies the number of cavities which can be filled at the same time, but retains the advantages of the present invention that each manifold is very compact and the main and inlet portions 74, 76 are integral or monolithic and have a common heating element.

What is claimed is:

1. In an injection molding melt distribution manifold having a main portion with a forward face and a rear face, a melt passage extending therethrough and branching therein to a plurality of spaced outlets on the forward face, an integral electrical heating element extending from an external terminal in a predetermined tortuous path in the main portion, the improvement wherein:

the manifold has an integral inlet portion extending rearwardly from the rear face of the main portion, the inlet portion having a cylindrical outer surface and a rear end, the melt passage extending centrally through the inlet portion from an inlet at the rear end, and the electrical heating element having a rear helical portion, a forward portion, and a central portion, the rear helical portion of the heating element extending around the inlet portion, the forward portion of the heating element extending in a predetermined tortuous path adjacent the forward face of the main portion of the manifold, and the central portion of the heating element extending through the main portion of the manifold to connect the rear helical portion of the heating element to the forward portion of the heating element.

2. An injection molding manifold as claimed in claim 1 wherein the rear helical portion of the electrical heating element is integrally brazed in a spiral channel in the cylindrical outer surface of the inlet portion of the manifold.

3. An injection molding manifold as claimed in claim 2 wherein the spiral channel has a wide portion closest to the rear end of the inlet portion of the manifold wherein several coils of the rear helical portion of the electrical heating element are wound side by side.

4. An injection molding manifold as claimed in claim 2 wherein the spiral channel in the cylindrical outer surface of the inlet portion of the manifold has a predetermined varying pitch.

* * * * *